United States Patent [19]

Hamasaki

[11] Patent Number: 5,273,689
[45] Date of Patent: Dec. 28, 1993

[54] WATER-EVAPORATION CONDUIT FOR A HUMIDIFIER

[75] Inventor: Sadakatu Hamasaki, Okayama, Japan

[73] Assignee: W. L. Gore & Associates, Inc., Newark, Del.

[21] Appl. No.: 908,718

[22] Filed: Jun. 24, 1992

[30] Foreign Application Priority Data

Jul. 5, 1991 [JP] Japan .................. 3-190951

[51] Int. Cl.$^5$ .............................................. B01F 3/04
[52] U.S. Cl. .................................................. 261/104
[58] Field of Search ................................. 261/104, 99

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102.1 |
| 4,194,041 | 3/1980 | Gore | 428/315 |
| 4,316,772 | 2/1982 | Cheng | |
| 4,381,267 | 4/1983 | Jackson | 261/104 |
| 4,708,831 | 11/1987 | Elsworth et al. | 261/104 |
| 4,921,642 | 5/1990 | Latorraca | 261/104 |

FOREIGN PATENT DOCUMENTS

| | | |
|---|---|---|
| 0160473 | 11/1985 | European Pat. Off. . |
| 0374605 | 6/1990 | European Pat. Off. . |
| 2408796 | 6/1979 | France . |
| 61-72948 | 4/1986 | Japan . |
| 61-72949 | 4/1986 | Japan . |
| 61-180842 | 8/1986 | Japan . |

*Primary Examiner*—Tom Miles
*Attorney, Agent, or Firm*—Gary A. Samuels

[57] ABSTRACT

The present invention provides a water evaporation conduit for use in humidifying equipment that is not adversely affected by contact with oils, detergents, and other liquids used in the manufacture and maintenance of the equipment.

5 Claims, 1 Drawing Sheet

WATER-EVAPORATION CONDUIT FOR A HUMIDIFIER

FIELD OF THE INVENTION

The present invention concerns a water-evaporation conduit for use in a humidifier, which makes use of a porous hydrophobic polymeric material.

BACKGROUND OF THE INVENTION

Humidifying equipment having porous hydrophobic water channels or conduits, and fans or other means to blow air across the porous surfaces of the conduits are known in the art.

The water conduits may be made of porous hydrophobic tubing or, in other cases, laminated constructions of porous hydrophobic sheet. The porous hydrophobic materials used as humidifier water conduits resist passage of liquid water through them, but permit passage of water vapor through them, thus humidifying the air stream passing over the porous surfaces. Polymeric materials used for the hydrophobic tubing or sheet include polyethylene, polypropylene, polystyrene, polyvinyl chloride, polyvinylidene chloride, polycarbonate, polyester, or fluoropolymers.

Porous hydrophobic tubing or sheet of the above materials, although having good initial water repellency and resistance to passage of liquid water through their pores, can lose their water repelling ability due to contamination or degradation caused by oily materials, surfactants, detergents, and the like, with which they come into contact in the course of their manufacture or use. When this occurs, water begins leaking from the conduits, leading to failure of the humidifiers.

An additional problem with such humidifying equipment is that during the initial charging of water into the conduits, or during subsequent normal usage, air pockets form in the conduits which resist displacement by the water. This results in lower evaporation rates and reduces the efficiency of the humidifiers.

SUMMARY OF THE INVENTION

This invention provides an improved water-evaporation conduit in humidifying equipment and the like. One improvement comprises a means to prevent contamination of porous hydrophobic water-vapor-permeable conduits used in such equipment by materials commonly encountered by them, for example, oils, surfactants, cleaning fluids and detergents, etc., which cause loss of hydrophobicity of the conduit materials and permit liquid water to pass through them, thus leading to leakage of water from the conduits and failure of the equipment.

A second improvement provides a means for complete displacement of air from the inside of the conduit as the conduit is filled with water, and which also, during operation, prevents development of air pockets inside the conduit which lower the humidifying performance of the conduit.

The improved water-evaporation humidifier conduit comprises porous hydrophobic tubing having on its inner surface a continuous coating of hydrophilic polyurethane material. Another embodiment of the invention comprises the improved water-evaporation tube described above and a second porous hydrophobic tube for air removal inserted axially along the length of the water-evaporation tube; the air-removal tube having its distal end closed to prevent entry of liquid water, and its proximal end open to permit displaced air to exhaust.

DETAILED DESCRIPTION OF THE INVENTION

Figure 1:
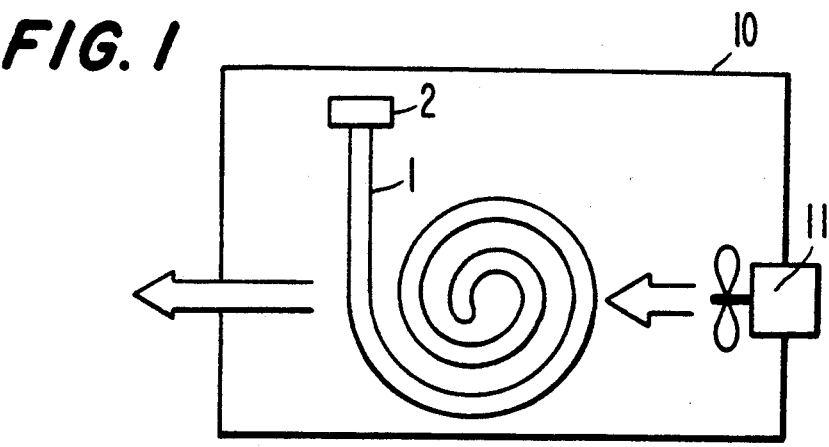
FIG. 1 is a schematic drawing of a simple humidifier.

A simple humidifier device 10 is shown schematically in FIG. 1. The humidifying equipment comprises a water-evaporation conduit 1 connected to a water-supply reservoir 2 above it. A fan 11 blows air over the surface of the water-evaporation conduit which entrains the water vapor emanating from the water-evaporation conduit. The air and entrained water vapor are blown out of the humidifier equipment into the surrounding environment, thus humidifying the environment around the humidifier.

Figure 2:
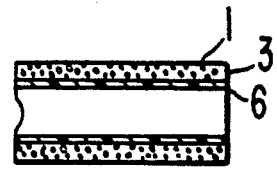
FIG. 2 is an axial cross-sectional view of the water-evaporation conduit.

Referring to FIG. 2, the water-evaporation conduit 1 is formed from a porous hydrophobic tube 3 which is coated on its inner surface with a continuous non-porous hydrophilic water-vapor-permeable coating 4.

Suitable polymeric materials for the porous hydrophobic tube 3 include polyolefin, polycarbonate, polyester, polystyrene, poly(vinyl chloride), polyvinylidene chloride, and the like. Preferred materials are fluoropolymers such as polyvinylfluoride, fluorinated ethylene/propylene (FEP), tetrafluoroethylene/perfluoroalkyl perfluorovinylether copolymer (PFA), polytetrafluoroethylene (PTFE), and the like. Most preferably, the porous hydrophobic tube is porous expanded polytetrafluoroethylene tube having the structure of interconnected nodes and fibrils described in U.S. Pat. No. 3,953,566 (Gore) and U.S. Pat. No. 4,187,390 (Gore).

The hydrophilic water-vapor-permeable coating 4 on the inner surface of the porous hydrophobic tube can be a polyurethane resin containing oxyethylene groups in a weight ratio of 30% or more, or a prepolymer thereof; a polyester resin containing oxyethylene groups in a weight ratio of 30% or more, or a prepolymer thereof; and a resin containing a sulfonic acid group, an amino group, a hydroxyl group, or a carboxyl group in a terminal group or a pendant group. The thickness of the continuous non-porous coating can be from 3 to 400 micrometers thick, and is preferably in the range 5 to 30 micrometers thick.

The water-vapor-permeability of the water-evaporation conduit should be at least 1,000 $g/m^2$/day, and is preferably in the range 5,000 to 90,000 $g/m^2$/day. Although having good water-vapor-permeability the continuous non-porous coating forming the inner surface of the water-evaporation conduit substantially prevents passage of air or liquids through its walls. Consequently, air pockets formed within the conduit, for example, as it is filled with water, are difficult to remove.

Figure 3:
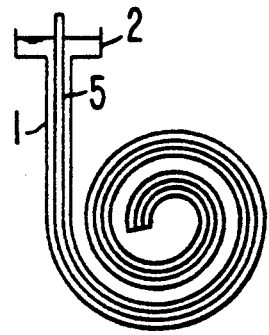
FIG. 3 is a schematic drawing of an air removal tube inserted in a water-evaporation conduit assembly.

FIG. 3 depicts the water-evaporation conduit 1 and water-supply reservoir 2 with an air-removal tube 5 inserted. The air-removal tube 5 is disposed axially within the water-evaporation conduit 1; its distal end closed and located near the closed end of the water-evaporation conduit, and its proximal end open and extended above the liquid level of the water-reservoir 2.

The air-removal tube is porous over its full length, permits air flow through its walls, and is made of porous hydrophobic polymeric materials for resistance to penetration of liquid water through its walls. Water entry pressure (WEP) of the porous hydrophobic air-removal tube should be at least 400 mm water pressure and, preferably is 500 mm water pressure or more in order to prevent leakage of water into the tube. The inner diameter of the air-removal tube can be 1 to 20 mm, preferably in the range 4 to 8 mm diameter. Suitable material for the air-removal tube can include the porous hydrophobic polymeric materials used for the water-evaporation tube and is preferably porous expanded polytetrafluoroethylene.

Figure 4:
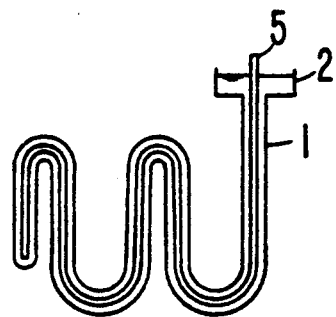
FIG. 4 is a schematic drawing illustrating an alternative configuratiion of the water-evaporation conduit.

FIG. 4 shows the water-evaporation conduit 1, water-reservoir 2, and air-removal tube 5 arranged in a cyclic waveform configuration.

The coil and waveform configurations shown in the drawings illustrate only two of many ways in which the coils can be configured and are not meant to be limiting.

TEST DESCRIPTIONS

Water Vapor Transmission Rate (WVTR)

Potassium Acetate Method

A description of the test employed to measure water vapor transmission rate (WVTR) is given below. The procedure has been found to be suitable for testing films, coatings, and coated products.

In the procedure, approximately 70 ml. of a solution consisting of 35 parts by weight of potassium acetate and 15 parts by weight of distilled water was placed into a 133 ml. polypropylene cup, having an inside diameter of 6.5 cm. at its mouth. An expanded polytetrafluoroethylene (PTFE) membrane having a minimum WVTR of approximately 85,000 g/m$^2$/24 hrs. as tested by the method described in U.S. Pat. No. 4,862,730 to Crosby and available from W. L. Gore & Associates, Inc. of Newark, Del., was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The WVTR of the sample was calculated from the weight gain of the cup assembly and was expressed in grams of water per square meter of sample surface area per 24 hours.

Water Entry Pressure (WEP)

Water entry pressure (WEP) of the air-removal tube is measured by filling the tube with water, connecting it to a metered pressure source, and increasing the pressure at a rate of 200 mm water pressure per minute. The pressure at which drops of water first appear on the outside of the tube is taken as the water entry pressure.

I claim:

1. In a humidifier, an improved water-evaporation conduit comprising
   (a) water-evaporation tubing of a porous hydrophobic polymeric material selected from the class consisting of polyolefin, polycarbonate, polyester, polystyrene, polyvinyl chloride, polyvinylidene chloride, and fluoropolymer; said porous hydrophobic tubing having on its inner surface
   (b) a continuous coating of hydrophilic water-vapor-permeable polyurethane material.

2. The improved water-evaporation conduit of claim 1, wherein the water-evaporation tubing is porous expanded polytetrafluoroethylene tubing.

3. The improved water-evaporation conduit of claims 1 or 2, wherein the water-evaporation tubing has a second porous hydrophobic tube for air removal inserted axially along its length, said air removal tube having a water entry pressure in excess of 400 mm water-pressure and said air removal tube having its distal end closed and its proximal end open.

4. The improved water-evaporation conduit of claim 3, wherein the material of the porous hydrophobic tube for air removal is selected from the class consisting of polyolefin, polycarbonate, polyester, polystyrene, polyvinyl chloride, polyvinylidene chloride, and fluoropolymer.

5. The improved water-evaporation conduit of claim 4, wherein the material of the porous hydrophobic tube for air removal is porous expanded polytetrafluoroethylene.

* * * * *